UNITED STATES PATENT OFFICE.

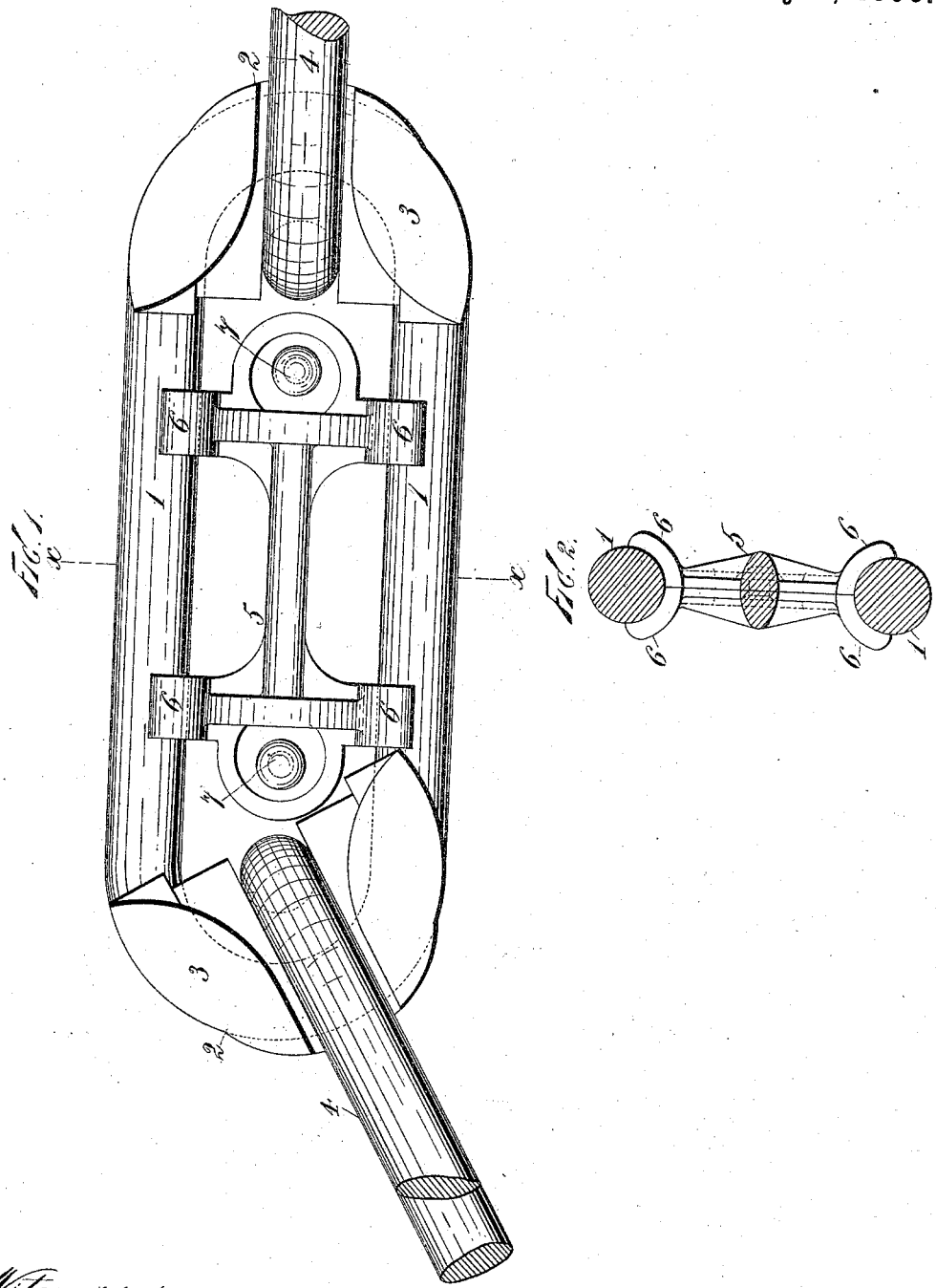

JAMES H. MITCHELL, OF PHILADELPHIA, PENNSYLVANIA.

DRIVE-CHAIN.

SPECIFICATION forming part of Letters Patent No. 542,486, dated July 9, 1895.

Application filed April 13, 1895. Serial No. 545,634. (No model.)

*To all whom it may concern:*

Be it known that I, JAMES H. MITCHELL, a citizen of the United States, residing in the city and county of Philadelphia, State of Pennsylvania, have invented a new and useful Improvement in Drive-Chains, of which the following is a specification.

My invention relates especially to drive-chains arranged to pass over or around sprocket-wheels, the teeth whereof engage with each alternate link, and has for its object the provision of simple and effective means whereby when the chain is removed from the sprocket-wheels or leaves them for any cause telescoping of the links and disarrangement or loss of the cross-heads or wearing-blocks at the ends of the alternate links is effectually prevented.

To attain the desired end my invention consists essentially in the combination, with a chain-link wherein are located cross-heads or wearing-blocks, of a locking-piece arranged to limit the movement of said cross-heads or wearing-blocks and prevent their displacement; and my invention also involves certain other novel and useful combinations or arrangement of parts and peculiarities of construction and operation, all of which will be hereinafter first fully described, and then pointed out in the claims.

In the accompanying drawings, forming a part hereof, Figure 1 is a plan view of a portion of a chain embodying my invention. Fig. 2 is a cross-sectional view at line $xx$ of Fig. 1.

Like numerals of reference, wherever they occur, indicate corresponding parts in both figures.

1 is a chain-link, made of any desired material and in any approved manner and formed with rounded ends 2. 3 are cross-heads or wearing-blocks grooved upon their outer faces for the reception of the rounded ends of the link 1 and upon their inner faces at right angles to the last-mentioned groove for the reception of the rounded ends of sprocket-engaging links 4. The cross-heads or wearing-blocks 3 are held in place in such a manner as to permit free movement, as indicated at the left of Fig. 1.

5 is a locking-piece preferably made in two parts which are provided at each side with curved arms 6, arranged to partly encircle the longitudinal sides of a link 1, the two parts being rigidly secured together, as by rivets 7, and firmly holding the piece 5 in place.

Without my locking appliance, if the chain by any accident should come off the sprocket-wheels, it will tangle itself up, form kinks, and a number of the cross-heads or wearing-blocks would drop out, causing vexatious loss of time and occasion serious trouble to put the chain in proper condition for use again.

By my improvement all this is obviated. The cross-heads or wearing-blocks cannot come out of engagement with the link, while at the same time they are free to move thereon, and the connected links are free to oscillate in either direction.

Having now fully described my invention, what I claim as new therein, and desire to secure by Letters Patent, is—

1. The combination with a chain link provided with cross-heads or wearing blocks, of an independent locking piece engaging the link and limiting the movement of the wearing block and its encircling link, substantially as shown and described.

2. The combination with a chain link having wearing blocks loosely held at each extremity, of a locking or holding piece interposed between the wearing blocks, in the body of the link, substantially as shown and described.

3. In a chain the links whereof are provided with movable cross-heads or wearing blocks, as set forth, a locking piece arranged to grasp each side of the link, limiting the movement of said cross-heads or wearing blocks substantially as shown and described.

JAMES H. MITCHELL.

Witnesses:
FRANK H. MASSEY,
MORTIMER A. JONES.